United States Patent [19]

Raidel

[11] Patent Number: 4,900,057
[45] Date of Patent: Feb. 13, 1990

[54] SUSPENSION SYSTEM WITH PIVOTALLY CONNECTED A-FRAME PARALLELOGRAM

[76] Inventor: John E. Raidel, Rte. 9, Box 400-M, Springfield, Mo. 65804

[21] Appl. No.: 220,088

[22] Filed: Jul. 18, 1988

[51] Int. Cl.[4] .............................................. B60G 11/28
[52] U.S. Cl. ..................................... 280/713; 280/689
[58] Field of Search ............... 280/711, 712, 713, 702, 280/724, 725, 726, 689

[56] References Cited

U.S. PATENT DOCUMENTS

| 2,369,501 | 2/1945 | Wagner et al. | 280/725 |
|---|---|---|---|
| 2,856,199 | 10/1958 | Walker | 280/712 |
| 2,881,799 | 4/1959 | Menewisch | 280/712 |
| 2,994,396 | 8/1961 | Bidwell | 280/711 |
| 4,181,323 | 1/1980 | Raidel | 280/711 |
| 4,309,045 | 1/1982 | Raidel | 280/711 |
| 4,379,572 | 4/1983 | Hedenberg | 280/711 |
| 4,773,670 | 9/1988 | Raidel, II | 280/713 |

FOREIGN PATENT DOCUMENTS 174298 3/1953 Austria .................................. 280/689

Primary Examiner—Charles A. Marmor
Assistant Examiner—Karin Tyson
Attorney, Agent, or Firm—Rogers, Howell & Haferkamp

[57] ABSTRACT

A suspension system has a lower torque rod with a forward end pivotally connected to a hanger and a rearward end pivotally connected to an axle seat assembly. An upper torque rod has a forward end pivotally connected to the chassis intermediate the sides thereof and a rearward end pivotally connected to the axle. Forward and rearward air springs are mounted between the axle seat assembly and the chassis fore and aft of the axle. The upper torque rod functions as the upper arm of a parallelogram and as a lateral stabilizer bar. The upper torque rod and a like torque rod on the opposite side of the vehicle cooperate with the axle to define an A-frame, but the connection of the upper torque rod to the chassis is independent of said opposite torque rod.

7 Claims, 2 Drawing Sheets

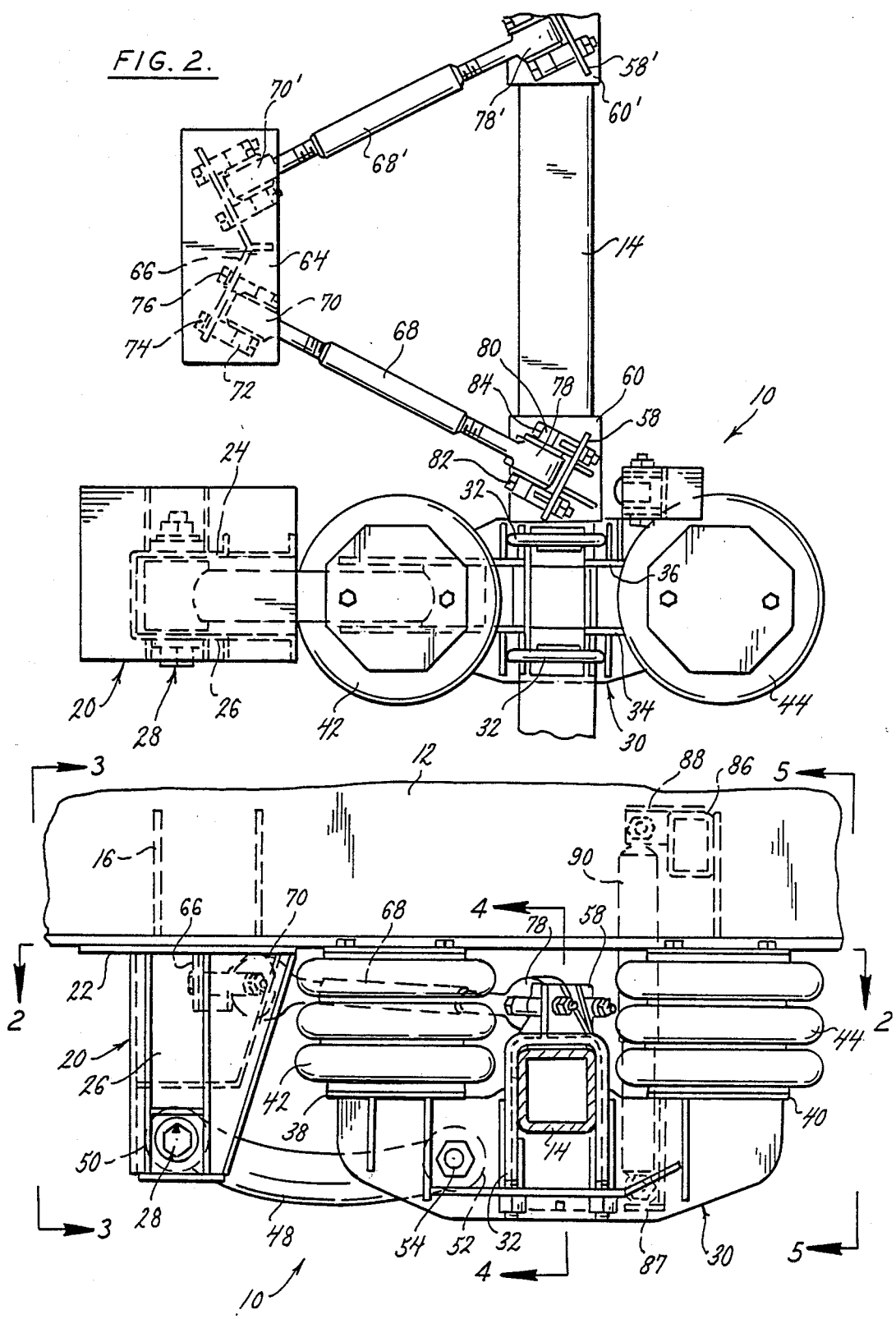

SUSPENSION SYSTEM WITH PIVOTALLY CONNECTED A-FRAME PARALLELOGRAM

BACKGROUND OF THE INVENTION:

This invention relates to a suspension system incorporating torque rods that define a parallelogram; one of the torque rods and a like torque rod on the opposite side of the vehicle defines an A-frame configuration; these torque rods are independently supported from the frame to provide stabilization of pitch as well as lateral stabilization while retaining independence of the suspension systems.

Various parallelogram suspension systems are known. U.S. Pat. Nos. 4,132,432 and 4,529,224 to Raidel, represent examples of such parallelograms. Raidel U.S. Pat. No. 4,500,112 also indicates that parallelograms having longitudinally offset pivot points are known and Raidel U.S. Pat. No. 4,181,323 indicates that a parallelogram having a lower torque beam that is bowed is known.

A suspension system having a parallelogram wherein the upper component is a torque rod and an A-frame configuration is disclosed in U.S. Pat. No. 4,773,670, filed Feb. 6, 1987 by John E. Raidel II. In that suspension system, the A-frame is a unitized member having torque rods joined at their inner ends and extending outwardly to the opposite sides of the vehicle. In this arrangement, the operation of the suspension system on one side of the vehicle affects the suspension system on the opposite side of the vehicle The present invention is particularly suitable for a steer axle for a trailer. The invention incorporates the advantages of the foregoing prior art patents, but provides a suspension system with a parallelogram and A-frame configuration that is independent of the suspension system on the opposite side of the vehicle.

SUMMARY OF THE INVENTION:

In this suspension system, a hanger depends from the vehicle chassis and an axle seat is connected to the axle. Dual air springs are mounted between the axle seat and the chassis at locations immediately forward and rearward of the axle. A lower torque beam has pivotal connections between the hanger and the axle seat with the forward pivotal connection comprising an eccentric bolt assembly. The torque beam is bowed downwardly to avoid interference with and provide access to other vehicle components. The upper torque rod comprises one half of an A-frame, the other half being provided by a like upper torque rod on the opposite side of the vehicle. The A-frame upper torque rod has a pivotal connection at one end to a bracket that is fixed to the axle and a pivotal connection to a bracket that is located at the center of the vehicle. The upper torque rod therefore provides lateral stabilization for the suspension system. The upper and lower torque rods define a longitudinal parallelogram. The upper torque rods of the A-frame are independently mounted and are operatable. Therefore the suspension systems for each side of the vehicle are mutually independent.

BRIEF DESCRIPTION OF THE DRAWINGS

FIG. 1 is a side elevation view of the suspension system;

FIG. 2 is a top plan view of the suspension system as viewed along the plane of the line 2—2 of FIG. 1;

Figure 3:
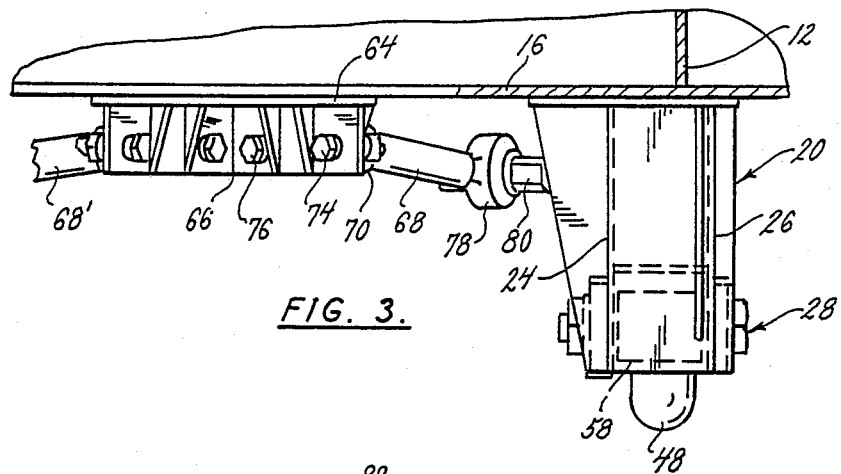
FIG. 3 is a front elevation view of the suspension system as viewed along the plane of the line 3—3 of FIG. 1.
Figure 5:
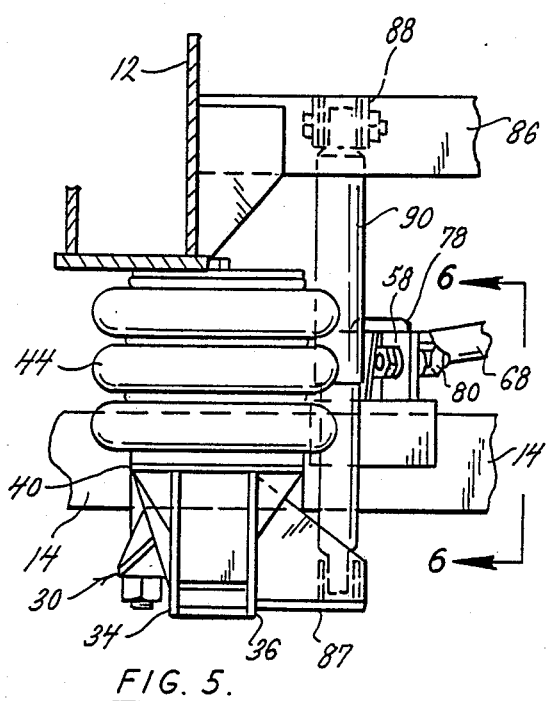
FIG. 5 is a rear elevation view of the suspension system as viewed on the plane of the line 5—5 of FIG. 1.
Figure 6:
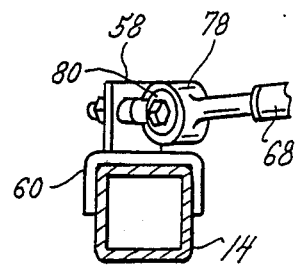
FIG. 6 is a view in section taken along the plane of the line 6—6 of FIG. 5.
Figure 4:
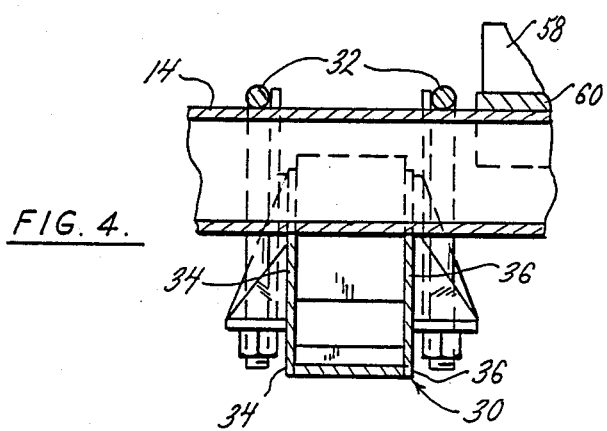
FIG. 4 is an enlarged view in section taken along the plane of the line 4—4 of FIG. 1.

DETAILED DESCRIPTION OF THE PREFERRED EMBODIMENT:

This suspension system is designed for installation on a trailer having a chassis side rail 12 and a steer axle 14. A cross member 16 extends transversely between the sides of the vehicle and is integral with the side rail 12 and a similar side rail on the opposite side of the vehicle.

A hanger 20 depends downwardly from the chassis side rail 12 immediately below the cross member 16. The hanger has a top plate 22 that may be bolted or welded to the chassis and has downwardly depending laterally spaced side plates 24 and 26 for supporting an eccentric bolt and bushing assembly 28 of the kind described and illustrated in Raidel U.S. Pat. No. 3,510,149.

A dual pedestal type axle seat assembly 30 is connected to the axle 14 by U bolts 32. The axle seat assembly 30 is formed with two transversally spaced verticle plates 34 and 36 that are suitably reinforced by cross members and gussets as is conventional. The axle seat assembly 30 has forward and rearward pedestals 38 and 40 for supporting dual air springs 42 and 44 that in turn are bolted to the side rail 12.

A downwardly curved lower torque rod 48 has a forward end 50 journaled on the eccentric bolt and bushing assembly 28 and has a rearward end 52 journaled on a bushing 54 that is mounted between the side plates 34 and 36 of the axle seat assembly 30. Just inboard of the axle seat assembly 30, a bracket 58 incorporates a saddle 60 that is welded to the axle 14. As shown in FIG. 2, there is a similar bracket 58' associated with a suspension system on the opposite side of the vehicle.

A plate 64 is welded to the cross beam 16 at a position equidistant from the sides of the chassis and supports a bracket 66. An upper torque rod 68 has a forward end 70 with a bearing 72 mounted on bolts 74 and 76 supported by the bracket 66. The rearward end 78 of the upper torque rod 68 has a bearing 80 mounted on bolts 82 and 84 supported by the rear bracket 58. A similar upper torque rod 68' has a forward end 70' similarly supported by the bracket 66 and a rearward end 78' similarly supported by a bracket 58'. As can be seen in FIG. 2, the upper torque rod 68 is oriented at an angle to the longitudinal axis of the vehicle, and the upper torque rods 68 and 68' cooperate with the axle 14 to define an A-frame. As illustrated in FIG. 1, the longitudinal distance between the forward and rearward ends 70 and 78 of the upper torque rod 68 is substantially the same as the distance between the forward and rearward ends 50 and 52 of the lower torque rod 48. Also as shown in FIG. 1, the upper torque rod 68 is staggered rearward of the lower torque rod 48. Nevertheless, longitudinally the upper and lower torque rods 68 and 48 form a parallelogram that maintains stabilization of the pitch of the axle 14 during verticle movements of the axle relative to the chassis.

Spaced inwardly, the axle seat assembly 30 supports a lower shock absorber bracket 87. There is a transverse beam 86 between the side rails 12 that supports an upper shock absorber bracket 88. A shock absorber 90 is mounted between the lower bracket 87 and the upper bracket 88.

The torque rods 68 and 68' cooperate to provide A-frame stabilization of the axle 14 and because the torque rods 68 and 68' are oriented at angles to the longitudinal axis of the vehicle, they provide lateral stabilization of the axle 14. A separate stabilizer bar is not required. Moreover, the torque rods 68 and 68' being independently connected to the bracket 66, the suspension 10 functions independently of a similar suspension on the opposite side of the vehicle.

Operation

The arrangement of the torque rods 48 and 68 of this suspension system 10 provide both longitudinal and transverse stabilization of the axle 14, and the suspension system 10 operates independently of a similar suspension system on the other side of the vehicle. For longitudinal stabilization, the torque rods 48 and 68 function as a parallelogram even though their ends are staggered and even though the upper torque rod 68 is inboard of the lower torque rod 48 and is at an angle to a longitudinal plane. Lateral stabilization is provided by the transverse component of the upper torque rod 68 by virtue of its orientation.

Since the axle seat assembly 30 is rigidly connected to the axle 14, and because the parallelogram maintains stabilization of the pitch of the axle 14, vertical movements of the axle relative to the chassis are absorbed generally equally by the air springs 42 and 44.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A vehicle suspension system for a vehicle having a chassis with opposed sides and an axle comprising: a hanger depending downwardly from a side of the chassis, an axle seat assembly rigidly connected to the axle, a lower torque rod having a forward end pivotally connected to the hanger and a rearward end pivotally connected to the axle seat assembly, a mounting bracket connected to the chassis at a location substantially equidistant between the sides thereof, an upper torque rod having a forward end pivotally connected to the bracket and having a rearward end pivotally connected to the axle whereby the upper torque rod is oriented at an angle to a longitudinal plane, and spring means mounted between the axle seat assembly and the chassis.

2. The suspension system of claim 1 wherein the upper torque rod is rearward of the lower torque rod and forms a parallelogram with the lower torque rod.

3. The suspension system of claim 1 wherein the spring means comprises a forward spring located forward of the axle and a rearward spring located rearward of the axle.

4. The suspension system of claim 1 wherein the lower torque rod is bowed downwardly between its ends.

5. The suspension system of claim 1 wherein the axle seat assembly has forward and rearward pedestals, and forward and rearward springs mounted between the pedestals and the chassis.

6. The suspension system of claim 1 wherein the said other end of the second torque rod is pivotally connected directly to the axle.

7. The suspension system of claim 1 wherein the connection of the first torque rod to the hanger is through an eccentric bolt and bushing assembly.

* * * * *